June 16, 1925.  1,541,999
L. A. PALEY
MOLDED ARTICLE AND METHOD OF MANUFACTURING SAME
Original Filed April 1, 1920   6 Sheets-Sheet 6
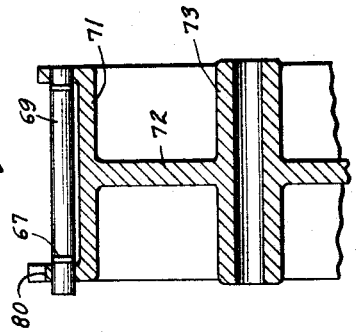
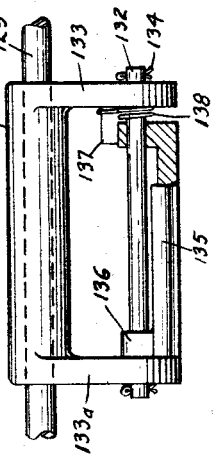
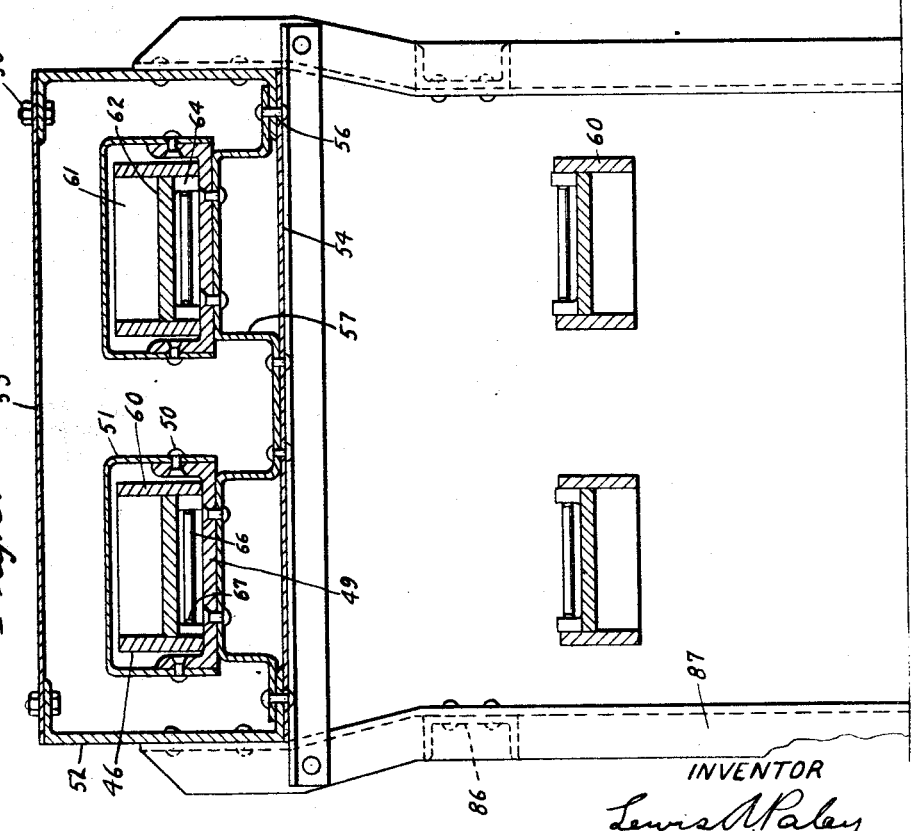
INVENTOR
Lewis A. Paley Patented June 16, 1925.

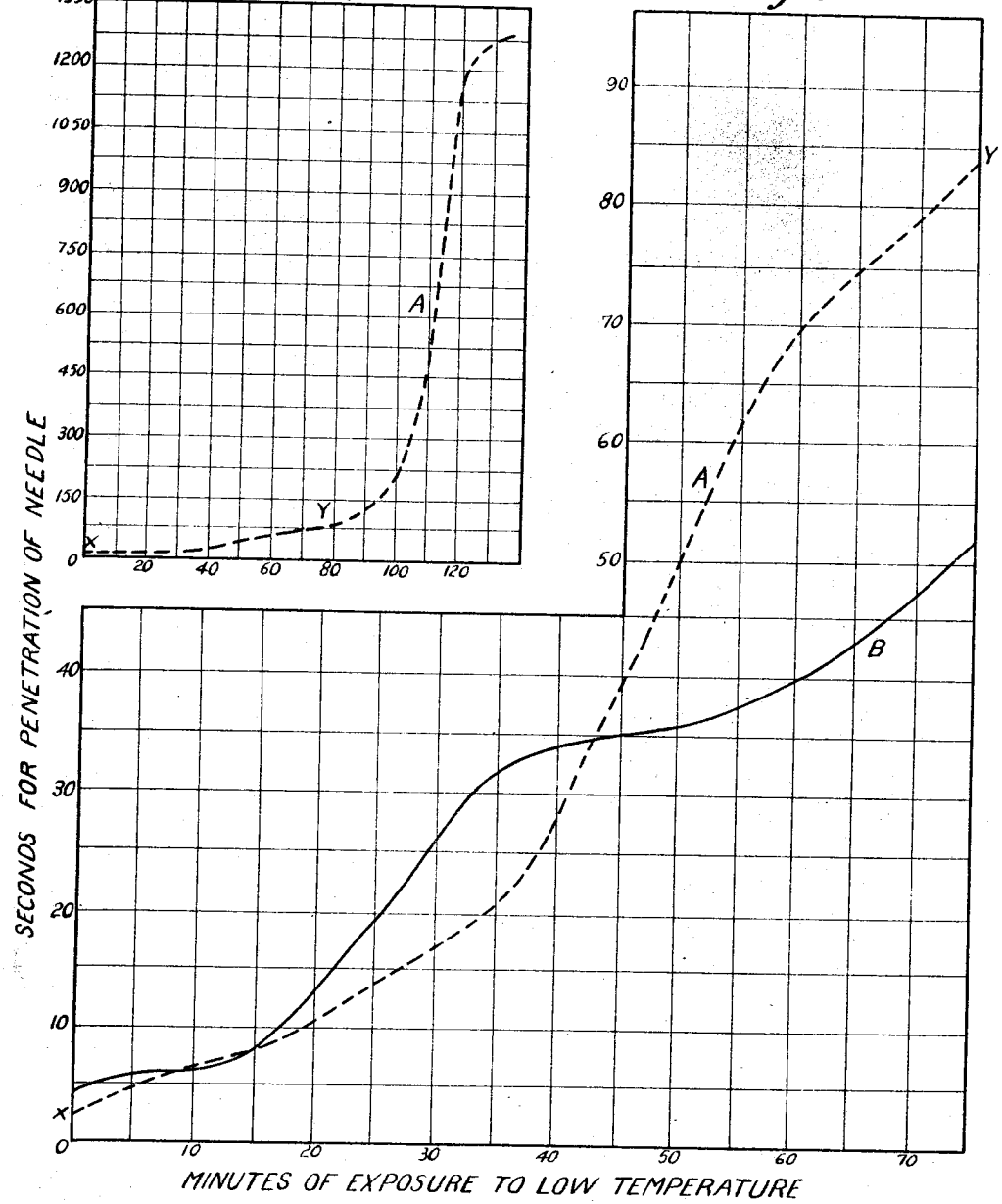

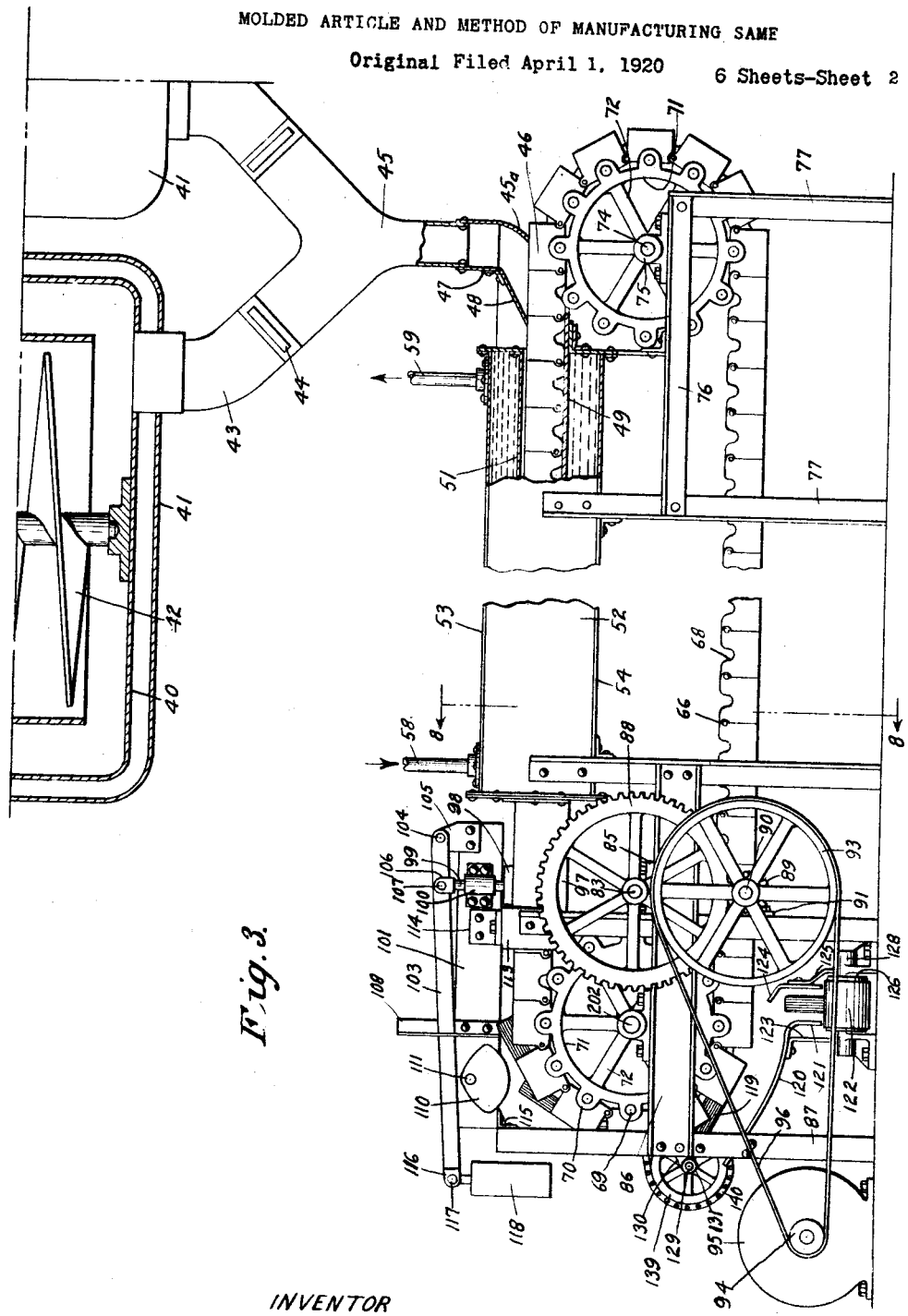

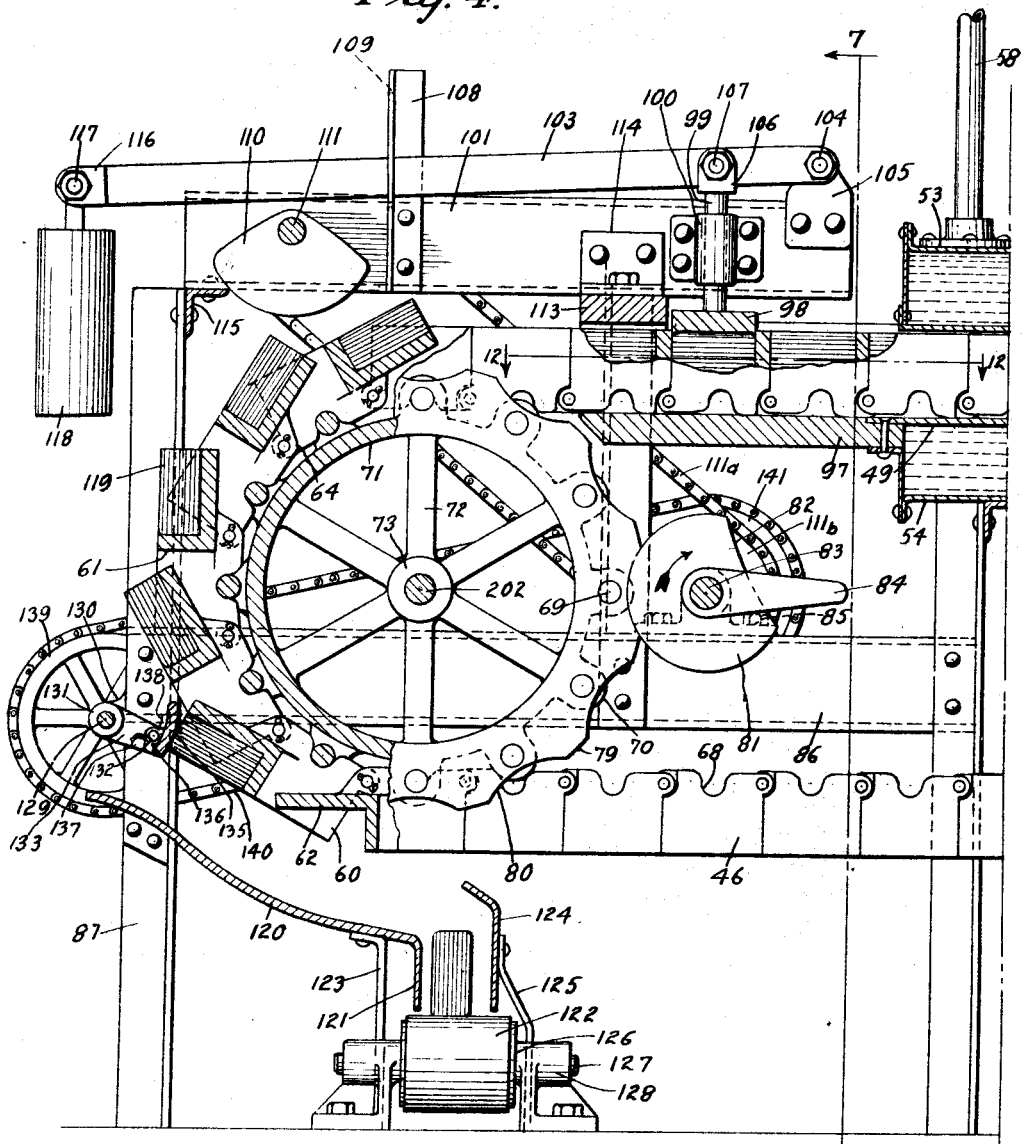

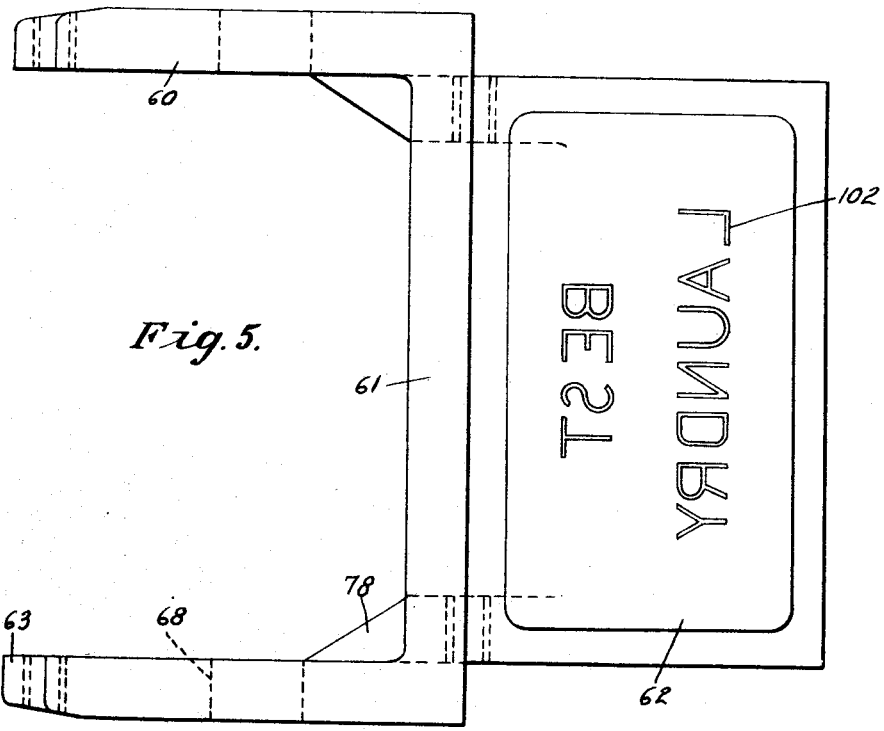
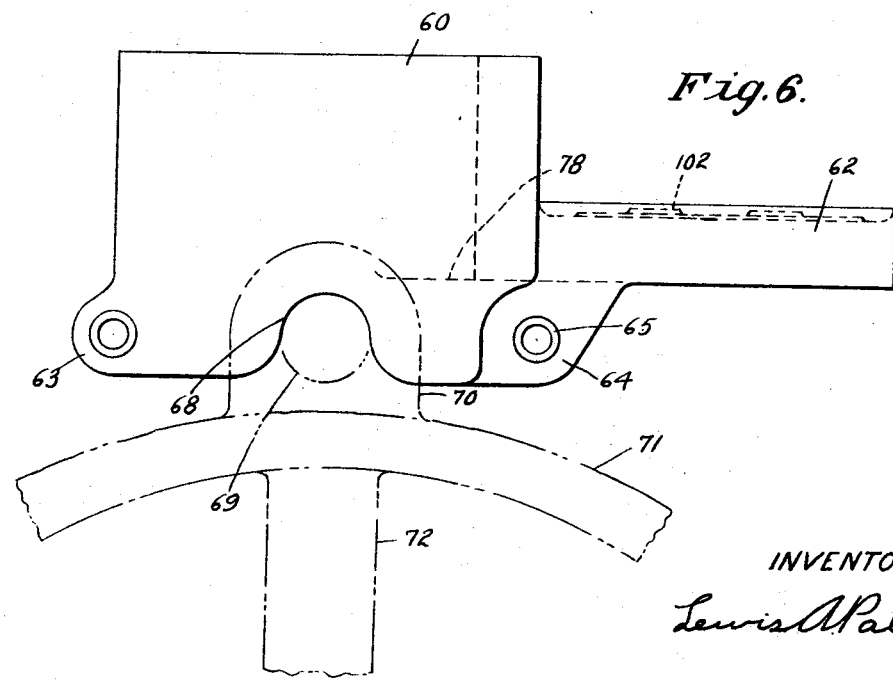

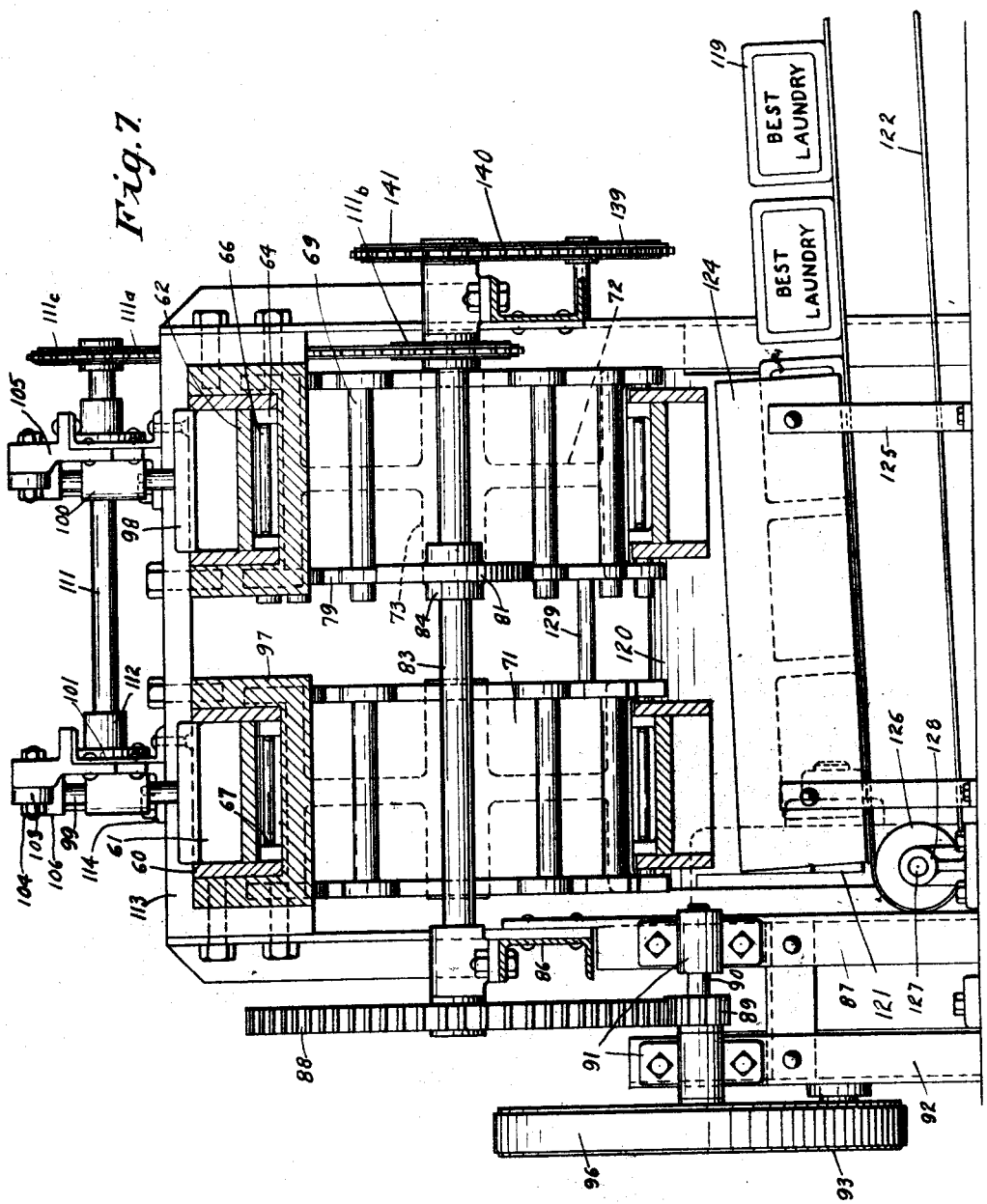

1,541,999

UNITED STATES PATENT OFFICE.

LEWIS A. PALEY, OF BUFFALO, NEW YORK, ASSIGNOR TO PALEY ENGINEERING COMPANY, OF NEW YORK, N. Y., A CORPORATION OF NEW YORK.

MOLDED ARTICLE AND METHOD OF MANUFACTURING SAME.

Original application filed April 1, 1920, Serial No. 370,441. Divided and this application filed December 7, 1921. Serial No. 520,624.

*To all whom it may concern:*

Be it known that I, LEWIS A. PALEY, a citizen of the United States, and a resident of Buffalo, county of Erie, and State of New York, have invented a new and Improved Molded Article and Method of Manufacturing Same, of which the following is a full, clear, and exact description.

This invention relates to a method for the manufacture of soap, paraffin, wax, stearin, gelatin, cocoa butter and other substances which are liquid when hot and solidify on cooling, and has reference more particularly to a method and its product in which the substance is artificially cooled until solidified, pressed, and wrapped while in a solid state.

This application is a divisional application carved from my copending application Serial No. 370,441, filed April 1, 1920, now matured to Patent No. 1,413,870. This application also discloses certain forms of the invention described in my copending application Serial No. 468,364, filed May 10, 1921.

As practiced at present, soap is prepared in the kettle by heating the mixture of fats and alkali by steam until hydrolysis takes place and the resulting soap is in a semi-fluid condition. The soap is then run from the kettle into the "crutcher," which is an apparatus for mechanically mixing the soap with various filling agents, such as soda ash, sodium silicate, borax, talc, etc. The "crutcher" is often steam jacketed so that the temperature of the contents may be accurately controlled. After the mixing is complete and the temperature is 140–144° F., the soap is run into a frame which is a box supported on trucks and provided with removable sides. This frame is then pushed by hand into a cooling room where it is allowed to cool for from four to six days. After the soap is cooled, the frame is "stripped," i. e., the sides are removed by hand, and the truck carrying the big cake of soap is pushed through a slabbing machine which cuts it into horizontal slabs. The slabs are then lifted by hand onto a cutting machine where they are cut into cakes and placed on trays which are put on drying racks and the soap is allowed to dry for one to eight days. The purpose of the drying is to form a thin "skin" of hard, dry soap on the outside of the bars so that the bars may be later pressed and stamped. This has been considered essential, since the bars of soap which leave the cutting machine are sticky, and if an attempt was made to press the soap in this condition it would adhere to the dies and would render the pressing and stamping impracticable. During the drying process, the bars of soap which originally contained about 30 to 35% moisture, lose about 3 to 5% moisture, all of the water being expelled from the surface of the bar so as to form the "skin," while the inner part of the bar still contains the original 30 to 35% water. The bars of soap are usually placed on an endless belt from the drying trays and this belt carries the soap to an automatic stamping machine which stamps the inscription on the bar of soap and presses it into compact form. From the stamping machine the bars of soap are carried by an endless belt to an automatic wrapping machine which wraps the soap in the usual paper wrappers, after which it is usually packed in boxes by hand, ready for shipment.

Thus the manufacturing process requires at least three weeks to prepare the soap for sale after it leaves the soap crutcher and includes the following steps: (*a*) framing, (*b*) stripping, (*c*) slabbing, (*d*) cutting, (*e*) drying, (*f*) stamping, and (*g*) wrapping, each step of which requires considerable time and a large amount of labor, the cost of which is daily becoming more important. In the frame the soap also segregates and a freshly cut surface of a finished bar of soap contains heterogeneous streaks, due to the large amount of filling material usually present in ordinary laundry soap. A large amount of scrap soap is formed during the slabbing and cutting steps and this scrap soap must be remelted and reworked at an additional expense. Manifestly, the entire manufacturing method, is very inefficient, a large amount of capital is tied up in soap stock during the process, and the method is intermittent, thus making a product which is not uniform in quality.

Numerous attempts have been made to shorten this process, which are mainly attempts to cool the soap by artificial means. In one method, an attempt is made to force the hot soap under pressure through an orifice which is artificially cooled, but with soap containing a large percentage of filling materials, such as laundry soaps, the structure of the soap is destroyed by passing through the orifice when nearly cold and hard and the resulting product does not have sufficient cohesion. Other devices for cooling the soap are of complicated mechanical construction, which makes a high cost of installation. Still other methods attempt to cool large masses of hot soap artificially, but owing to the very low thermal conductivity of soap a long time is required in the cooling process. All of the processes depend upon drying the soap after cooling in order to form a "skin" on the outside of the bar suitable for stamping, and all attempts have been only partially successful or not at all.

An object of this invention therefore is to provide a method for the manufacture of soap which will greatly decrease the time necessary in its preparation for sale.

Another object of the invention is to provide a method in which segregation of the filling materials is prevented and the quality of the soap is greatly improved.

Another object of the invention is to provide a method of the class indicated which will be continuous, thus insuring a product of uniform and high quality.

Another object of the invention is to provide an apparatus for carrying out this process which will be automatic, thus greatly decreasing the cost of labor in the manufacture of soap, will not cause the formation of scrap soap, said apparatus being adapted to cool the soap artificially and press it without necessitating the intermediate steps of framing, stripping, slabbing, cutting and drying.

Another object of this invention is to provide a method of cooling soap in small masses, so as to greatly reduce the time of cooling.

A further object of this invention is to provide a machine of the class indicated, which may be designed with small capacity, but may also be designed with a very large capacity without materially increasing the number of operating parts required by the smaller machines.

Reference is to be had to the accompanying drawings forming a part of this specification in which it is understood that the drawings illustrate only one form of apparatus suitable for carrying out the improved method and in which—

Figure 1 is a graphical curve showing the hardening due to super-cooling of a typical brand of laundry soap.

Figure 2 is a portion $x$—$y$ of the curve shown in Figure 1 on a large scale, together with a similar curve for another brand of laundry soap.

Figure 3 is a side elevation of the improved machine for carrying out the soap making process, with parts broken away to disclose the construction.

Figure 4 is a central sectional view through the stamping end of the machine with parts broken away to disclose the construction.

Figure 5 is a top view of one of the buckets or molds of which the bucket chain is composed.

Figure 6 is a side elevation of a bucket.

Figure 7 is a sectional view through the machine on the line 7—7 of Figure 4.

Figure 8 is a section through the machine on the line 8—8 of Figure 3.

Figure 9 is a fragmentary central sectional view through a driving bucket sprocket wheel.

Figure 10 is a plan view, partly in section, of the device which extracts the cakes of soap from the buckets.

In obtaining the data on which the curves shown in Figures 1 and 2 were based, a needle 2.5 centimeters long was provided with a head which weighed 150 grams. A cake of commercial laundry soap was cut in two, and this cake was subjected to a temperature of $-7°$ C. At frequent intervals the needle was suspended so as to just touch the freshly cut surface of the soap and was then released, the time necessary for the needle to completely sink into the soap being observed in seconds. In the graphs, the minutes of exposure to low temperature were made the abscissa and the seconds necessary for the complete penetration of the needle were made the ordinates. The resulting curve indicates clearly the effect of the super-cooling on the hardness of soap. As shown by the curve, the principal hardening effect was obtained with the soap while cooling from 80–120 minutes and the maximum hardness was obtained when the soap had cooled for two hours, which shows that the soap has a very low thermal conductivity. In Figure 2 the portion $x$—$y$ of the curve A, shown in Figure 1, is greatly enlarged and is compared to the curve B of another typical example of laundry soap. It was observed that the sticky character of the freshly cut surface of commercial laundry soap at the ordinary temperature of about 25° C. was completely lost after three minutes of exposure to the temperature of $-7°$ C., and that the soap became so hard after cooling for two hours that a cake might be dropped on a hard surface from a considerable height without being appreciably damaged. Thus the formation of a "skin" by drying, which has always been considered necessary for preparing the soap for stamping, may be completely eliminated if the soap is stamped while in a super-cooled state so that its sticky character is eliminated.

Referring to the remaining drawings of the machine in which like numerals represent like parts in the several views, 40 indicates a crutcher which is preferably surrounded by a steam jacket 41 so that steam or cooling water may be passed around said crutcher, thus controlling the temperature of the contents. The soap from the kettle, not shown, is run into this crutcher and any suitable stirring mechanism, such as a screw 42, mixes the soap thoroughly with various filling agents. I preferably provide a pair of crutchers for each cooling machine so that when one crutcher has become empty, the contents of the remaining crutcher may be run into the endless chain of buckets to be hereinafter described while the first crutcher is being refilled and its contents mixed. The two crutchers are connected with each other by means of a Y-shaped pipe 43, each arm of which is provided with a valve 44, so that one valve may be closed while the hot liquid soap is running out of the other crutcher. The Y-shaped pipe 43 terminates at its lower end in one or more pipes 45, each of which empties directly into an endless chain of molds or buckets collectively designated by the numeral 46. The rear side 45ᵃ of the lower end of the pipe 45 is curved forwardly so as to direct the stream of soap into the chain of buckets 46 in the direction of motion of said chain, and the front side of the pipe 45 has hinged to it by means of a spring hinge 47 a plate 48. This plate rests obliquely on the top of the bucket chain 46, so that the soap is pressed into the buckets and scraped level while the spring hinge allows a slight movement in said plate to allow for slight inequalities in the upper surfaces of the buckets.

After being filled with the hot liquid soap the bucket chain 46 passes onto any supporting member, such as the channel strip 49, to which is secured, by means of rivets 50, a cooling chamber 51, which surrounds said bucket chain 46. This chamber 51 is surrounded in turn by an outer chamber which may be constructed of two side channel strips 52, a top plate 53, and a bottom plate 54, secured to the flanges of said channel strips by means of bolts 55 and rivets 56, respectively. The channel strips 49 are suitably supported inside the outer chamber by means of any type of brackets 57 riveted to said channel strips 49 and to said bottom plate 54. Any cooling medium, such as a solution of sodium or calcium chloride from a refrigerating apparatus, not shown, is introduced into the outer chamber by means of an intake pipe 58 and is removed by means of an outlet pipe 59, said pipes being secured to the upper plate 53. The direction of flow of the cooling medium is preferably counter-current to the direction of motion of the bucket chain 46 so that a substantially constant difference of temperature is maintained throughout the length of the cooling chamber between the cooling medium and the soap, thus insuring a high cooling efficiency. Thus the soap is cooled, solidified and hardened as it passes through the cooling chamber 51 and may be then stamped and discharged from the buckets.

The buckets of the chain 46 are preferably constructed so that the hand cake of soap is positioned with its broadest surface horizontal and to accomplish this the buckets are constructed with end walls 60 connected on each end of said walls, with a transverse, integral, side wall 61. Each bucket is bottomless, but a bottom 62 for the adjacent bucket is formed integral on the lower side of the wall 61 opposite the walls 60. This bottom has exactly the length and width of the hand cake of soap which it is desired to form and this bottom is also of such length as to slidably fit between the walls 60 of the adjacent bucket. It is thus seen that the soap molds form a series or chain of interlocking buckets. The buckets are pivotally secured together by means of lugs 63 which are formed on the lower front side of the walls 60 so as to engage lugs 64 on the adjacent bucket, which are formed on the lower front side of the bottom 62, so as to also serve as reinforcing means between said bottom and said walls 60 and 61. The entire bucket may be made of any suitable metal, but it is preferred to make it by die casting and sleeves 65 of hard metal are cast into the lugs 63 and 64, which serve as bearings for pivot pins 66, held in place by means of split pins 67, engaging the inner surface of the lugs 64. Semi-circular recesses 68 are formed in the lower side of the walls 60, so as to receive the rods 69, which are supported in outstanding ears 70, formed on each side of a rim 71 of a sprocket wheel having spokes 72 and a hub 73. The hub 73 is secured to a shaft 74, and said shaft is journaled in suitable bearings 75 which are supported by any suitable horizontal beams 76, which in turn are supported by vertical standards 77. The vertical standards also serve to support the channels 52 to which they are riveted so that the cooling chamber 51 is correctly positioned to receive the endless chain of buckets 46. The lugs 64 of the buckets extend somewhat further downwardly than the lugs 63 and said lugs 64 are provided with stops 78 each of which support one corner of the adjacent bucket bottom 62, so that when the soap, which the bucket contains, is stamped by the mechanism to be hereinafter described, the lug 64, which rests on the channel 49, will take the pressure from the rear side of the adjacent bucket bottom 62 without throwing the pressure on the pins 66. The sprocket wheels are preferably two in number for each chain, one at the crutcher end of the machine and the other at the stamping end of the machine.

The bucket chains may be in any number to handle the output of the crutchers, but for a pair of small crutchers it is preferred to use two bucket chains. It is desired to have the bucket chains 46 moved with an intermittent motion so that at each dwell a cake of soap may be pressed at one place on the chain while at another place a cake of soap may be discharged. The ears 70 on one edge of a sprocket wheel on the stamping end of the machine are modified to form a scalloped flange 79 in which is formed a plurality of semicircular recesses 80. one adjacent each of the rods 69, and these recesses are adapted to be consecutively engaged by a circular disc 81 which has a clearance segment 82 removed from it. This disc 81 is secured coaxially to a shaft 83 and an arm 84 is formed on or secured to said disc adjacent the segment 82. The rods 69 on this sprocket wheel extend beyond the scalloped flange 79 so that as the shaft 83 is rotated, the disc 81 will hold the sprocket wheel accurately in position while it rotates as shown in Figure 4, and when said arm 84 rotates to a position diametrically opposite said position, it will engage the outer end of the adjacent bar 69, thus moving the sprocket wheel and the bucket chain to a position where the disc 81 will engage another recess 80. The shaft 83 is mounted in bearings 85 which are secured to horizontal beams 86 supported by vertical standards 87. Any suitable mechanism may be used for rotating the shaft 83 continuously, such as a spur gear 88 secured to one end of said shaft and engaging a spur pinion 89 secured to a shaft 90, said shaft being rotatably mounted in bearings 91, which are preferably bolted to one of the standards 87 and to an auxiliary vertical standard 92. A pulley 93 may be secured to one end of the shaft 90 which is connected to a pulley 94 of a motor 95, by a belt 96. Thus the mechanism described will give the bucket chain 46 an intermittent motion, and since said chain is driven at the stamping end of the machine, the upper run of the bucket chain will be kept taut, while the lower run of the bucket chain will be somewhat slack.

Preferably, but not necessarily, I provide mechanism for stamping the buckets of soap after they have passed from the cooling chamber 51, which consists of a channel 97 riveted to the end of said cooling chamber and made of heavier material, so as to withstand the stamping pressure and so as to prevent the end walls 60 of the buckets from spreading when under pressure. A die 98 is secured to the lower end of a rod 99 slidably mounted, with its axis vertical, in a bearing 100, which may be riveted to any supporting frame work, such as a channel strip 101. The lower side of the die 98 may be provided with any suitable advertising inscriptions in raised letters and any other suitable advertising inscription 102 may be formed in raised letters on the upper surface of the bucket bottoms 62, so that if the die 98 is reciprocated downwardly into a bucket during a dwell in the motion of the bucket chain 46, the advertising characters will be clearly stamped on both sides of the cake of soap and the soap will be compressed into compact form. Any suitable mechanism may be used for reciprocating the rod 99 in the bearing 100, which may take the form, as shown, of a lever 103, which is pivotally mounted by means of a bolt 104 to a bracket 105 riveted to one end of the channel strip 101. The upper end of the rod 99 is formed into a fork 106 in which the lever 103 is pivotally secured by means of bolt 107. An angle strip 108 is riveted to the channel strip 101, and a slot 109 is formed in the outstanding leg of said angle strip, said lever passing through said slot so that its rocking motion will be guided thereby. The lever 103 is rocked about its pivot 104 by a cam 110 which is secured to a shaft 111 rotatably mounted transversely of the channel strip 101 in bearings 112. The shaft 111 may be rotated by a chain 111$^a$, leading from a sprocket wheel 111$^b$ on the shaft 83 to a sprocket wheel 111$^c$ secured to the shaft 111. A U-shaped brace 113 is bolted to the edges and sides of the channel 97 and angle clips 114 are riveted to said brace 113 and to the channel strip 101 so as to rigidly secure the latter in position to withstand the strain of the stamping mechanism. One end of the strip 101 may be secured to the vertical standards 87 by a transverse angle strip 115, riveted to said channel strip and to said vertical standards. The end of the lever 103, opposite the pivot 104 is provided with a forked end 116, in which is pivotally suspended, by means of a bolt 117, a weight 118. Thus when the cam 110 is in its lowermost position, as shown in Figure 4, the weight 118 will force the die 98 downwardly by means of the lever 103, and the soap in the bucket will be stamped thereby as well as pressed into the bucket in a compact mass of uniform size regardless of any shrinkage in the soap caused by the cooling.

As the bucket 46 leaves the stamping die 98 and passes around the sprocket wheel, the bottom attached to each bucket moves vertically between the sides 60 of the adjacent bucket, carrying with it a cake of soap 119 which is stamped, and hard, due to its super-cooled state. Ordinarily when the bucket is upturned the cake of soap 119 will drop out of the bucket of its own weight and fall on a chute 120, which is secured to the vertical standards 87 and terminates at its lower end in a vertical member 121 positioned directly above an endless belt 122. The lower end of this chute is supported by a bracket 123 riveted thereto. The cakes of soap 119 will usually fall on the chute 120 on their broad side and on sliding down the chute, which is at such an angle as to give a slow motion to said cake of soap, will strike against a shield 124 which is supported in a vertical position, by a bracket 125, directly above the endless belt 122, so that the cake of soap will drop onto the endless belt 122 on edge between the shield 124 and the vertical member 121. The endless belt 122 is mounted on a pulley 126, which in turn is mounted on a shaft 127, rotatably mounted in bearings 128. This endless belt 122 leads upwardly from under the stamping end of the apparatus and delivers the cakes of soap 119 directly to a standard automatic wrapping machine, not shown. The cakes of soap will be wrapped by this machine while hard, due to their super-cooled state, so that they will not be damaged during the wrapping process, and after leaving the wrapping machine they are immediately packed in boxes ready for shipment and will return to normal temperature after being placed therein.

In order to make sure that every cake of soap falls out of the buckets when said buckets are overturned, a transverse shaft 129 is rotatably mounted in bearings 130 secured to the vertical standards 87 and a U-shaped bracket 131 is secured to the shaft 129, said bracket having a spindle 132 secured between its legs 133 and 133a, by means of split pins 134 (Figs. 4 and 10). A dog 135 is preferably arcuate in cross section and is provided at each end with an outstanding flange 136, each of which is rotatably mounted on the spindle 132. A lug 137 is formed on the leg 133 so as to abut one of the flanges 136 and limit the movement in one direction of the dog 135 about said spindle. Between one of the flanges 136 and the leg 133, a coil spring 138 is mounted on the spindle 132, one end of which engages said lug 137, and the other engages the dog 135 so that as the shaft 129 is rotated in a clockwise direction, as seen in Figure 4, the dog 135 will engage the edge of the cake of soap 119 and will be resiliently pressed thereagainst by said spring so that the cake of soap will be forced from the bucket. In order to rotate the shaft 129, a sprocket wheel 139 is secured to one end of said shaft and a chain 140 connects said sprocket wheel to a sprocket wheel 141 secured to the shaft 83.

For most of the laundry soaps it will be sufficient to wrap the soap up and pack it in boxes while in a super-cooled state, without first drying it, but for some special types of soap it may be desirable to dry the soap somewhat before wrapping it.

In operation the liquid soap from one of the crutchers 40 is run into the pipe 45, through the pipe 43, by opening one of the valves 44, and said liquid soap runs from the pipe 45 into the chain of buckets 46 under a low pressure, due to the head of the column of soap, thus insuring that the buckets are completely filled. The soap is scraped level on top of the buckets by means of the plate 48 pressing resiliently against the top of said buckets due to the spring hinge 47. After the buckets are filled with the hot liquid soap they pass into the cooling chamber 51, which is surrounded by cold brine introduced through the intake pipe 58 said brine escaping out of the outlet pipe 59. The metal sides 61 of the buckets have several hundred times the thermal conductivity of the soap, so that the heat is quickly conducted away from between the cakes of soap, thus insuring that each cake is cooled uniformly on all sides so as to form a hard, outside surface suitable for stamping, wrapping and packing and equivalent to the "skin" which is formed on the cakes of soap at present by drying. The chain of buckets 46 is given an intermittent motion by means of the disc 81 carrying the arm 84 and secured to the shaft 83, which rotates continuously. The disc 81 consecutively engages the semi-circular recesses 80 in the scalloped flange 79 and as said arm 84 is rotated it engages the outer end of the adjacent rod 69, thus moving the bucket chain 46 the length of another bucket. The shaft 83 is rotated continuously by means of the gear 88 engaging the pinion 89, said pinion being secured to a shaft 90 on the other end of which is secured the pulley 93 and the belt 96 connects the pulley 93 to a pulley 94 of the motor 95. The stamping die 98 is positioned above the chain of buckets 46 and is secured to the end of the rod 99, which is reciprocated vertically by means of the lever 103 pivoted at 104 and having a weight 118 suspended from its opposite end. The lever 103 is rocked about its pivot 104 by means of the cam 110 secured to the shaft 111 which is rotated by means of the chain 111a operated from the shaft 83. As the bucket chain 46 moves around the sprocket wheel the cakes of soap 119 will usually fall out of the buckets onto the chute 120 of their own weight and slide down said chute, landing on the endless belt 122, which carries them directly to the automatic wrapping machine. In case any of the cakes of soap cling to the buckets, the dog 135 mounted on the bracket 131, engages the edge of the cake of soap as the shaft 129 rotates and is pressed resiliently thereagainst by means of the spring 138, associated with said dog. The shaft 129 is rotated continuously by the chain 140 operated from the shaft 83.

Thus it is seen that the process of manufacturing soap as now practiced, which includes the steps of (a) framing, (b) stripping, (c) slabbing, (d) cutting, (e) drying, and (f) stamping, and which occupies a period of at least three weeks may be reduced by my improved process and apparatus to a period of less than one hour by leaving out the steps (a) framing, (b) stripping, (c) slabbing, (d) cutting, and (e) drying, of the process. The soap is also handled automatically with a minimum labor cost, is cooled in small masses thereby greatly reducing the cooling time, produces a better quality of soap due to its homogeneity, produces no scrap soap which would necessitate reworking at additional expense and eliminates the interest charge now necessary on the large amount of capital invested in soap stock and machines necessary in the present process.

If it is desired to dry a special type of soap, the cakes are taken from the chute 120 to any type of standard drier such as those now in use or to a continuous drier such as the one described in my aforementioned copending application.

I would state in conclusion that while the illustrated example constitutes a practical apparatus for carrying out my method, many other forms of apparatus may be used in carrying out the method without departing from the spirit of the invention as defined in the appended claims.

Having thus described my invention I claim as new and desire to secure by Letters Patent:

1. A method of treating soap and the like, which includes introducing hot, liquid soap into a plurality of molds, moving said molds while subjected to a cooling medium so as to cool said soap to solidified soap cakes, stamping an inscription on said cakes while in a solidified state, and discharging said cakes from said molds.

2. A method of treating soap and the like, which includes introducing hot, liquid soap into a plurality of molds, moving said molds while subjected to a cooling medium so as to cool said soap to a temperature below normal, so as to form hardened soap cakes, stamping an inscription on said cakes while in a hardened state, and discharging said cakes from said molds.

3. A method of treating soap and the like, which includes introducing hot, liquid soap into an endless chain of molds, a plurality of inscriptions being formed on the molds, moving said molds while subjected to a cooling medium so as to cool said soap to solidified soap cakes bearing the imprint of the mold inscriptions, and discharging said cakes from said molds.

4. A method of treating soap and the like, which includes introducing hot, liquid soap into a plurality of molds, a plurality of inscriptions being formed on each mold, moving said molds while subjected to a cooling medium so as to cool said soap to solidified soap cakes bearing the imprint of the mold inscriptions, pressing said cakes while in a solidified state, and discharging said cakes from said molds.

5. A method of treating soap and the like, which includes introducing hot, liquid soap into an endless chain of molds, a plurality of inscriptions being formed on each mold, moving said molds while subjected to a cooling medium so as to cool said soap to solidified soap cakes bearing the imprint of the mold inscriptions, discharging said cakes from said molds, and wrapping said cakes of soap.

6. The method of making soap, which includes continuously dividing a large mass of hot, liquid soap into smaller portions, subjecting said portions to a temperature below normal to form solidified cakes having a cold, non-sticky skin, and stamping an inscription on said cakes while cold.

7. The method of treating soap and the like which consists in subjecting the hot, liquid soap to a cold, refrigerating medium until the surface of said soap is super-cooled below normal temperature and solidified, and stamping an inscription on the cold surface of said soap.

8. The method of treating soap and the like, which includes continuously dividing a large mass of hot, liquid soap into smaller portions, subjecting said portions to a cooling medium so as to form a solid, non-sticky surface on said soap, and modifying the shape of said surface by the application of pressure.

9. The method of manufacturing soap, which consists in continuously forming a large quantity of hot, liquid soap into small portions, subjecting said portions to a cooling medium maintained at a low temperature so as to form cakes, and then subjecting the cakes to the action of a moving fluid at a higher temperature than that of the cooling medium.

10. The method of treating soap which includes introducing hot, liquid soap into a movable series of molds, subjecting said soap to a cooling medium to form solid cakes, removing the cakes from the molds and subjecting said cakes to the action of moving air at a higher temperature than that of said cooling medium.

11. A cake of soap and the like formed by solidifying the hot, liquid soap in a mold, said cake bearing a pattern imprint formed during the solidification by a pattern on the mold, said cake also having a surface shaped by pressure after solidification of the cake 12. A cake of soap and the like formed by solidifying the hot, liquid soap in a mold, said cake bearing a pattern imprint formed by pressure while the cake is in the mold and after the solidification of said soap.

13. A cake of soap having a glossy surface, said cake being formed by solidifying the hot, liquid soap in a die-cast mold by the application of a cooling fluid.

14. The method of treating a substance which includes introducing the hot, liquid substance into a series of molds moving in a continuous path, subjecting the substance in the molds to a cooling medium so as to solidify the substance to form cakes, said molds being made by die-casting so as to impart a smooth surface to the cakes, and removing the cakes from the molds.

15. The method of treating soap which includes introducing the hot, liquid soap into a moving, endless chain of molds, subjecting the soap in the molds to the action of a cooling medium so as to solidify the soap to form cakes, said molds being made by die-casting so as to impart a smooth, glossy surface to the cakes, and removing the cakes from the molds.

16. The method of molding soap and the like which includes subdividing a mass of hot, liquid soap into smaller portions, moving said portions while subjected to a cooling medium to affect solidification of the soap to form cakes, and moving said cakes while subjected to a moving current of air.

17. The method of molding soap and the like which includes introducing hot, liquid soap into an endless chain of molds, moving said molds while subjected to a cooling medium to affect solidification of the soap to cakes, removing the cakes from the molds, depositing said cakes on a moving conveyor, and subjecting said cakes to the action of moving air while on said conveyor.

LEWIS A. PALEY.